United States Patent [19]

Keough

[11] Patent Number: 5,115,593
[45] Date of Patent: May 26, 1992

[54] TEMPERATURE SENSITIVE DOWNRIGGER ASSEMBLY

[76] Inventor: Richard Keough, 8867 Rushside Dr., Pinckney, Mich. 48169

[21] Appl. No.: 614,233

[22] Filed: Nov. 15, 1990

[51] Int. Cl.$^5$ .............................................. A01K 91/00
[52] U.S. Cl. ...................................... 43/43.12; 43/4; 43/27.4
[58] Field of Search ................. 43/43.12, 4, 26.1, 27.4

[56] References Cited

U.S. PATENT DOCUMENTS

| | | | |
|---|---|---|---|
| 3,808,731 | 5/1974 | Lowrance | 43/4 |
| 3,922,808 | 12/1975 | Rieth et al. | 43/4 |
| 4,274,219 | 6/1981 | Way | 43/43.12 |
| 4,376,350 | 3/1983 | Bednarz et al. | 43/27.4 |
| 4,495,721 | 1/1985 | Emory, Jr. | 43/27.4 |
| 4,667,892 | 5/1987 | Pease | 43/27.4 |
| 4,713,967 | 12/1987 | Overs et al. | 43/4 |
| 4,793,088 | 12/1988 | Fortuna | 43/4 |

Primary Examiner—Richard K. Seidel
Assistant Examiner—Chuck Y. Mah
Attorney, Agent, or Firm—Gifford, Groh Sprinkle, Patmore and Anderson

[57] ABSTRACT

A temperature-sensitive downrigger assembly is provided for seeking out then maintaining a pre-selected water temperature. The present invention incorporates a downrigger assembly having a temperature sensor provided approximately at the cannon ball end of the downrigger cable. A temperature selector is provided for the user to select a desired temperature. The depth of the cannon ball and its associated hook and lead is automatically and linearly adjusted to match the temperature selected by the operator. A jigging action is optionally provided.

17 Claims, 4 Drawing Sheets

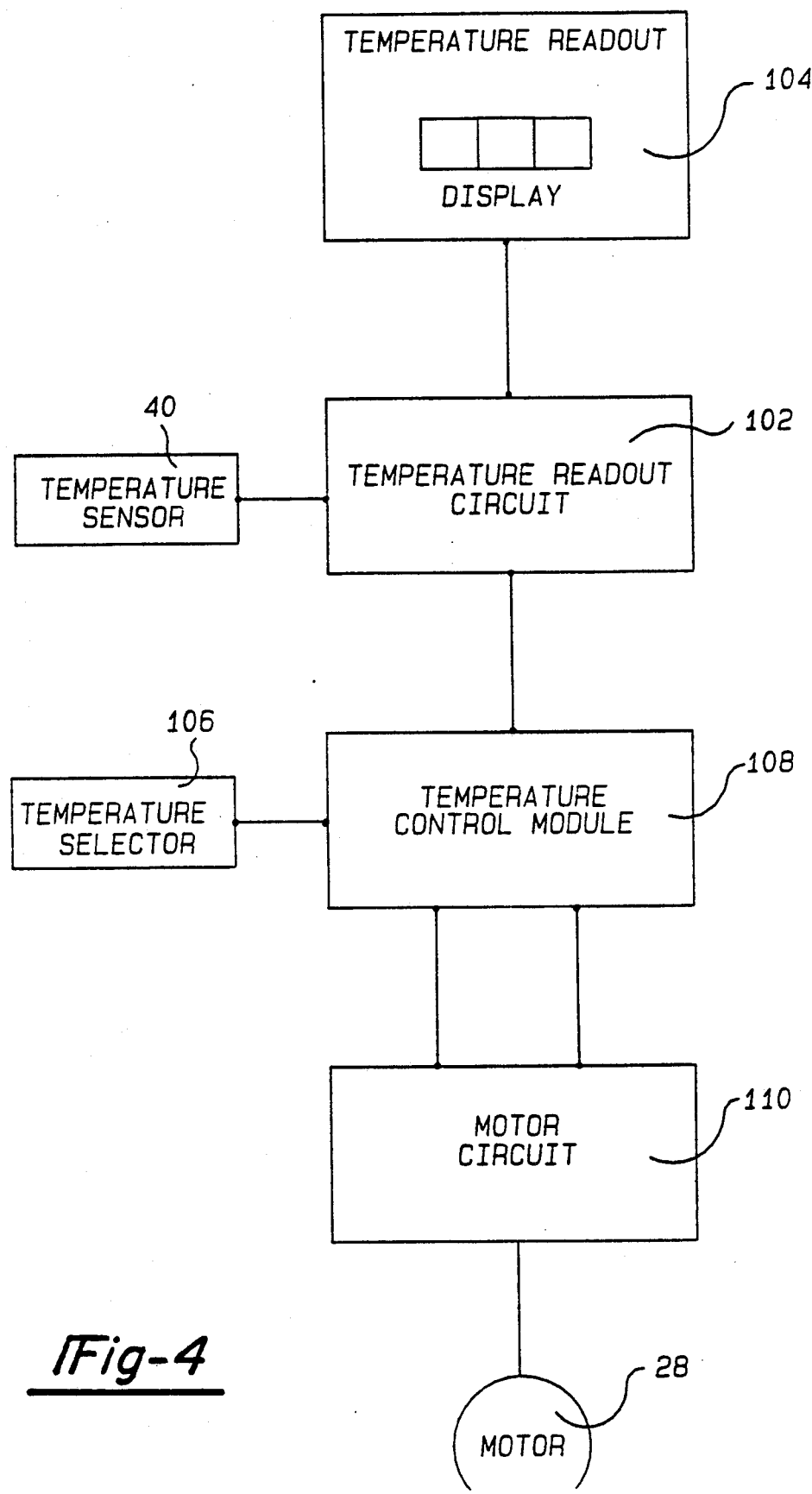
IFig-4

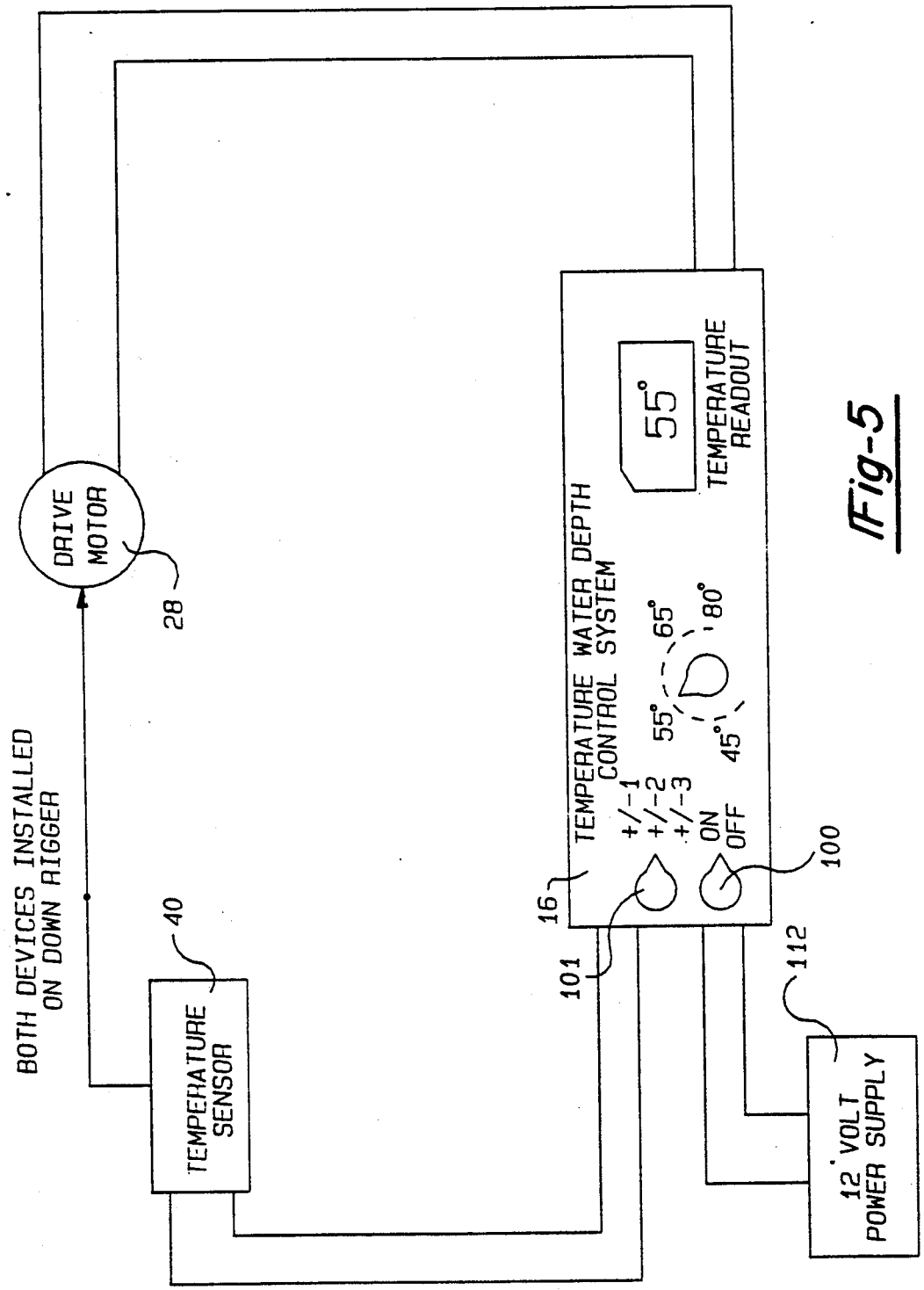

TEMPERATURE SENSITIVE DOWNRIGGER ASSEMBLY

BACKGROUND OF THE INVENTION

I. Field of the Invention

The present invention relates to a temperature sensitive downrigger assembly. More particularly, the present invention relates to a downrigger assembly that may be programmed to have the weighted and hooked end of the line seek out then remain at a preselected region of water according to temperature.

II. Description of the Relevant Art

Sport fishing has a great and long tradition. Many people who enjoy the hobby of fishing began fishing with their parents when they were very young. In this way the hobby has developed into a great tradition, handed down from generation to generation.

Many forms of fishing are known to the sport fishermen and these forms include casting and trolling. As to the former form, casting is usually done from the shore of a body of water or sometimes may be done from a fixed artificial object such as a dock. Casting may also be done off of a boat that is sitting still in the water.

Another form of fishing that is well known and very commonly undertaken is trolling. Trolling is typically undertaken by the fishermen employing a moving boat and having a line following along in the water as the boat proceeds along in its course. The trolling action of the line and the associated lure give the impression to the passing fish that the object is in motion, thereby making the lure appear as though it is living. Naturally a living lure, or at least one which appears to be living, is much more interesting to a hungry fish than is a conventional artificial lure. It is therefore this trolling action which adds considerable interest to the lure for the fish.

Trolling is typically undertaken using a device conventionally known as a "downrigger". The downrigger includes a drive motor having an attached cable. At the free end of a downrigger cable is fitted a weight, often referred to as the "cannon ball". The weight is used as an attachment point for a fishing reel hook lead. If a fishing reel hook and its associated line were merely dropped into the water off of a trolling boat, the hook itself would be extended virtually in a straight line away from the boat and away from the end of the fishing rod. Accordingly, the hook end lead is attached to the area of the cannon ball on the downrigger cable.

For convenience, the rod and reel associated to the downrigger assembly are mounted generally on or about the motor of the downrigger assembly. As it is conventionally used, the person doing the trolling observes the line associated with the rod and reel without actually having to hold the rod and reel. Through the person's observations, if a line suddenly becomes taut (more taut than it would normally be while trollinq), and if the rod appears to bend downwardly at its far end, a fish has indeed taken the bait.

There are several problems associated with known downrigger devices. The first is the general problem that much is unknown about the temperature preferences of certain fish. This general lack of knowledge is compounded by the fact that the preferred temperature of certain species of fish changes throughout the seasons. The other problem is that even if the preferred water temperature of a particular species of fish was known, it is difficult to determine at what depth the cannon ball and its associated hook are being situated. For example, if one having knowledge about a particular body of water determines that at a fifty-five foot depth the temperature is at a particular level at which, for example, salmon prefer to reside, then one may drop the line to the fifty-five foot depth. However, the formula usually is not that simple. Because of wave action, currents, bottom topography, season, and other variable factors, very often this fifty-five foot figure has only limited utility.

The trolling fishermen generally is frustrated in all attempts to identify, to reach, and ultimately to maintain a particular water temperature.

At various times efforts have been made to overcome problems typically related to use of a downrigger assembly in fishing at particular depths. For example, a water temperature measurement apparatus is disclosed in U.S. Pat. No. 4,782,617 issued on Nov. 8, 1988, to Peikin. This invention discloses a water temperature measuring device that includes a temperature sensor and a reel assembly. The temperature sensor is used to measure the temperature of water at a given depth.

In another effort to provide a solution to the problem of downrigging devices for use at selected temperatures, U.S. Pat. No. 4,050,180, was issued on Sep. 27, 1977 to King. This invention discloses a temperature and depth indicating downrigging reel in which the downrigger is fitted with a temperature sensing device for sensing the temperature at a given depth of water.

However, neither of these references overcomes the problem of maintaining a desired temperature while the user is employing a downrigger assembly. Thus, the prior approaches to solving the problem of providing an efficient means of seeking out then maintaining a particular temperature of water while using a downrigger assembly have failed to provide a solution.

SUMMARY OF THE PRESENT INVENTION

The present invention provides a temperature-sensitive downrigger assembly for seeking out and maintaining a pre-selected water temperature. The downrigger assembly incorporates a reel and rod and a temperature sensor provided approximately at the cannon ball end of the downrigger cable. A temperature selector is provided for the user to select a desired temperature. The depth of the cannon ball and its associated hook and lead is automatically and linearly adjusted to match the temperature selected by the operator.

To power the electronics of the present invention, a portable power supply is provided, preferably in the form of a 12 volt vehicle battery. The power system of the marine vehicle may be used for this purpose.

The operator's controls include a control switch for selecting a desired water temperature, and a temperature readout for indicating the actual temperature at which the cannon ball end and its associated hook and lead are situated.

Related to the drive motor of the downrigger assembly, a depth readout is provided so that the user will know approximately at what depth the cannon ball end is being positioned.

The fishing line of the rod and reel is normally kept taut between the end of the rod and the cannon ball end of the downrigger assembly cable, and the rod is slightly bent. If the user of the present invention gets a "strike", an automatic release is provided at the cannon ball end whereby the fishing line is released from the cannon ball end, and in this way, because of the tension released from the bent fishing pole, the hook is securely fixed to the fish.

So that the user can more efficiently utilize the rod and reel, a cradle is provided within which the rod is releasably mounted. The cradle is fitted to the downrigger assembly so that the rod is in working relationship with a belt that is driven by the downrigger cable motor, so that the downrigger cable motor and the reel and its associated line are caused to move simultaneously in the same direction. A quick release is provided whereby the rod and reel assembly can be easily removed and reattached to the downrigger assembly without complex manipulations on the part of the user.

According to the present invention, therefore, a trolling fisherman can easily select the preferred temperature, for example, for fishing for salmon, and, once the temperature is set on the control board, the downrigger assembly will obtain and maintain the selected temperature at the related depth. In this way, a fisherman can optimize the time spent fishing while also providing further information about the temperature preferences for certain kinds of fish.

As an alternative embodiment, the downrigger assembly of the present invention can also be provided with an automatic jigging action whereby the cannon ball end of the downrigger cable assembly and its associated lead and hook jig linearly in an up and down motion to thereby provide further attraction to the fish being sought.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawings, in which like reference characters refer to like parts throughout the views, and in which:

FIG. 4 is a schematic diagram illustrating the temperature-water depth control system; and FIG. 5 is a schematic diagram illustrating the main elements or the electronic system of the present invention.

DETAILED DESCRIPTION OF THE PREFERRED EMBODIMENTS OF THE PRESENT INVENTION

Figure 1A:
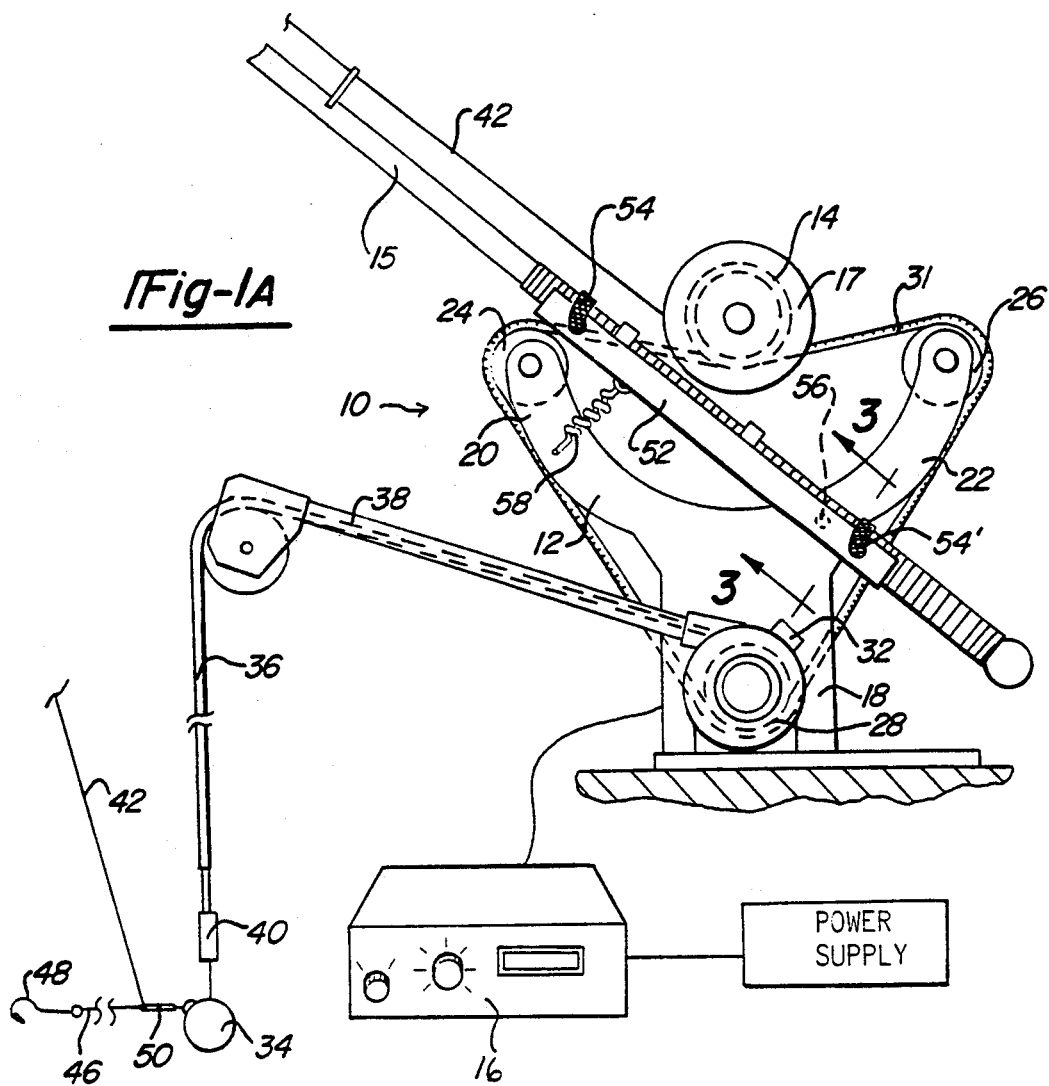
FIG. 1A is a raised elevational side view of the downrigger assembly of the present invention illustrating the rod and reel assembly attached thereto and also illustrating the control box in relation to the downrigger assembly.

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1A, a temperature sensitive downrigger apparatus is illustrated generally as 10. The apparatus 10 includes a downrigger portion 12 and a rod and reel portion 14. The rod and reel portion 14 includes a rod 15 and a reel 17. A controller unit 16 is provided for controlling and operating the apparatus 10.

The downrigger portion 12 comprises a support member 18 having a first arm 20 and a second arm 22. Pivotably mounted at the end of the first arm 20 is a first carry pulley 24 and pivotably mounted at the end of the second arm 22 is a second carry pulley 26.

At the approximate lower end of the support member 18 is provided a drive motor 28. The drive motor 28 includes a drive pulley belt 30 (see FIG. 2) and a depth counter 32. The depth counter 32 indicates the depth of a cannon ball weight 34 that is fitted to the free end of a cable 36. The weight 34 is provided to maintain as much as possible the depth of the cable 36 even when the boat (not shown) to which the apparatus 10 is attached is moving at trolling speed.

The cable 36 may be composed of any durable and flexible material such as a nylon or a metal cord. The cable 36 is wound upon or unwound from a pulley provided within the housing of the motor 28. A support arm 38 is provided to suspend the cable 36 over and away from the side or end of the trolling boat.

Fitted upon the cable 36 at a point just above the weight 34 is a temperature sensor 40. The sensor 40 senses the ambient water temperature and transmits an electronic signal to the controller unit 16 via wiring provided within or along the cable 36.

Attached to the weight 34 is a fishing line 42. The line 42 is selectively wound upon or unwound from the reel 17 provided upon the rod and reel portion 14. A lead line 46 is extended from the weight 34 to which is fixed a baited or unbaited hook 48.

A quick-release attachment 50 is preferably provided which, when sufficient pull is put upon the lead line 46 by a hooked fish, releases the line 42 and the lead line 46 from the weight 34. This quick-release action results in the line 42 being snapped up (because a slight tension already exists on the line 42 and the pole 15 is accordingly bent somewhat; when the release mechanism 50 is caused to release, the pole 15 is snapped into its straight position immediately).

The support member 18 has provided thereupon a cradle 52 for releasably receiving and holding the pole 15. A pole release system is provided by which the pole 15 can be quickly and easily removed from the cradle 52 in the event of a fish being hooked, whereafter the operator of the apparatus 10 removes the rod and reel portion 14 and manually maneuvers it to further perfect the catch of the victim fish. Release of the portion 14 is achieved preferably by the provision of a pair of releasable members 54, 54' which are comprised of a hook and loop fastener system (see FIGS. 2 and 3).

Figure 1B:
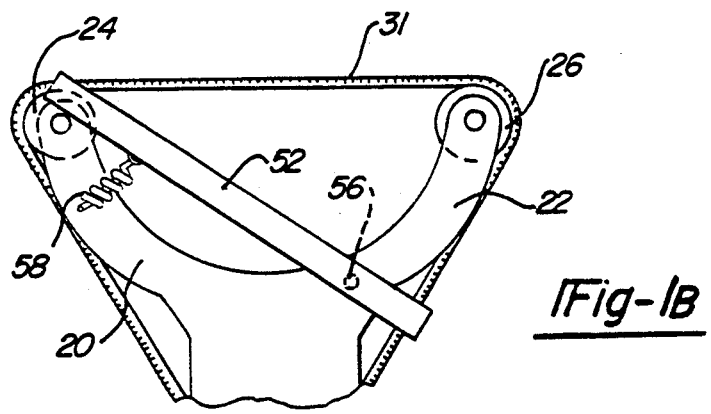
FIG. 1B is a detailed view of the upper portion of the downrigger assembly with the rod and reel having been removed to thereby reveal details of the drive cable in its unflexed position.

The cradle 52 is pivotably mounted to the support member 18 at a pivot point 56. To retain proper tension upon the belt 31 by the rod and reel portion 14, a retaining spring 58 is preferably fitted, between the underside of the cradle 52 and the first arm 20. This aspect of the support member 18 is illustrated in FIG. 1B. With reference thereto, the cradle 52 is illustrated without its associated rod and reel portion 14 in place. Both the spring 58 and the belt 31 are accordingly illustrated in their untensioned states.

Figure 2:
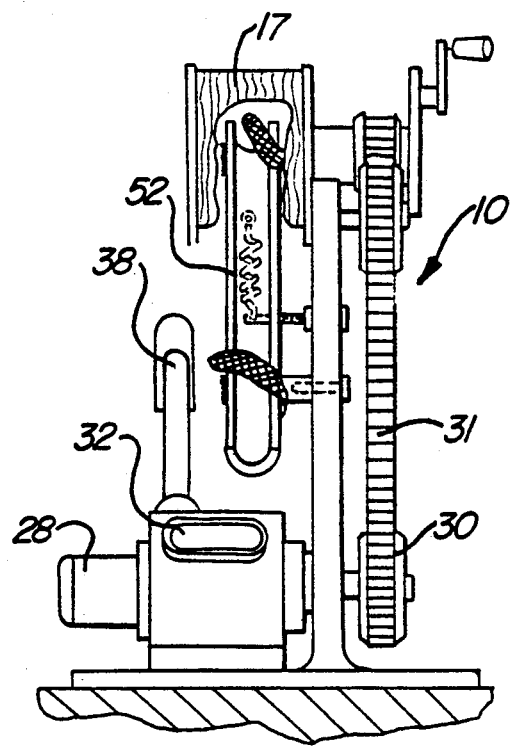
FIG. 2 is an elevated end view illustrating the present invention with the reel of the rod and reel assembly shown in partial cutaway.

Referring to FIG. 2, an end view of the apparatus 10 is illustrated. This view shows the reel 17 in place although partially cut away to reveal the relative position of the cradle 52.

Figure 3:
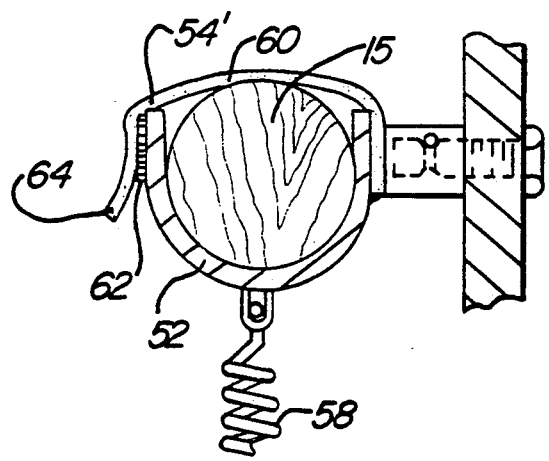
FIG. 3 is a sectional view taken along lines 3—3 of FIG. 1A and illustrating the rod handle resting in place on the downrigger assembly cradle.

Referring to FIG. 3, a sectional view taken along lines 3—3 of FIG. 1 illustrates the detail of the releasable member 54'. The member 54 and the member 54 as illustrated in FIGS. 1A and 2) includes a looped belt 60 and a hook base 62. A tab 64 provided on the end of the belt 60 is available for easy grasping by the user in releasing the rod and reel portion 14.

Referring to FIG. 4, a schematic disclosing the circuit elements is illustrated. The temperature sensor 40 functions as a transducer to convert heat energy to electrical energy, thereby sensing ambient water temperature. An analog signal is directed to a temperature circuit 102 which in turn in part converts the signal from analog to digital to read out on a temperature readout display 104.

An analog temperature selector 106 is used by the operator to select a desired temperature (see FIG. 5). The temperature selected on the selector 106 is received as an analog signal in a temperature control module 108. The control module 108 compares the signals received from the temperature circuit 102 and the temperature selector 106, and, in response, outputs either a negative or a positive signal to a motor circuit 110 (including amplifier) which, in turn, selectively drives the motor 28 in a wind up or output direction. The temperature control module 108 also includes an oscillating timing circuit to provide a temporary delay in the circuitry. This delay desensitizes the apparatus 10 somewhat so that it is not in constant motion to compensate for a temporary variance in temperature.

Referring to FIG. 5, a system block diagram is illustrated for simplification. The controller unit 16 (see FIG. 1A) comprises the temperature circuit 102, the temperature readout 104, the temperature selector 106, the temperature control module, and the motor circuit 110. An on-off switch 100 is provided to turn the motor on and off. Power to operate the system is drawn from a conventional and rechargeable power source, such as a 12 volt automobile battery 112. Alternatively, the alternator of a boat can be used to provide unlimited power.

A useful feature of the apparatus 10 is a jigging action to attract the attention of fish. A variance controller 101 is provided to select a range of temperatures within which the sensor 40 and its related hook 48 can travel. For example, if a desired temperature of 55° is selected and a variance of 0° is also selected, the sensor will seek out and maintain only 55°. If a variance of +/− 2° is selected, the apparatus 10 will first achieve a temperature/depth position for 55°, and will thereafter continue down to 53° after which time it will move up to 57°. This action may be repeated as desired.

Not only does this jigging action attract fish, but also it will permit movement into slightly higher or lower temperatures of water, thereby compensating for imperfect knowledge of fish behavior and for straying fish.

Operation of the apparatus 10 includes the steps of: An operator selecting a desired temperature according to the preferences of the sought-after fish; adjusting the temperature selector 106 to that preferred temperature; and turning the knob 100 to the "on" position. Thereafter the controller unit 16 will automatically seek out and maintain the desired temperature.

In the event that the preferred temperature of the sought-after species of fish is unknown, the apparatus 10 of the present invention will provide considerable utility in research in this area.

Having described my invention, however, many modifications thereto will become apparent to those skilled in the art to which it pertains without deviation from the spirit of the invention as defined by the scope of the appended claims.

I claim:

1. A downrigger system for automatically seeking and reaching a desired water temperature, said system comprising:
   a power-driven downrigger assembly;
   a drive motor fitted to said assembly;
   a weight cable, said weight cable being fitted to said downrigger assembly, said cable having an end region;
   a weight fitted to said end region of said cable;
   a fishing pole and reel assembly fitted to said downrigger assembly;
   a water temperature selecting-sensing-driving circuit, said circuit including a temperature selector, a temperature sensor, and a fishing pole and reel assembly and downrigger assembly drive unit, whereby the operator selects a temperature, the sensor senses the temperature, and signals the drive unit for adjustment in response; and
   means for connecting said motor and said reel of said pole and reel assembly.

2. The downrigger system of claim 1 wherein said system further includes means for linearly jigging said cable.

3. The downrigger system of claim 1 wherein said temperature sensor is fitted to said end region of said cable.

4. The downrigger system of claim 3 wherein a length of fishing line is stored on said reel of said pole and reel assembly, said line having a free end, said free end of said line being fitted to said weight.

5. The downrigger system of claim 4 wherein said free end of said line is releasably attached to said weight.

6. The downrigger system of claim 4 wherein said temperature selector includes a temperature selector switch.

7. The downrigger system of claim 6 wherein said temperature selector further includes a temperature read out.

8. The downrigger system of claim 3 wherein said means for interconnecting comprises a belt.

9. The downrigger system of claim 8 wherein said pole and reel assembly is removably attachable to said downrigger assembly.

10. The downrigger system of claim 9 wherein said reel is releasably engageable with said belt.

11. The downrigger system of claim 10 wherein said pole of said pole and reel assembly rests substantially within a pole cradle, said pole cradle having a lower end and an upper end, said lower end being pivotably attached to said downrigger assembly, said upper end and said downrigger assembly being interattached by a biasing member.

12. In combination with a motor-driven downrigger having a cable end region and a weight attached thereto, a water temperature-sensitive system to automatically seek and reach a region of water having a preselected temperature, said combination including:

a fishing pole and reel assembly fitted to said downrigger;

said reel assembly including a reel;

a thermal sensing element disposed on said end region of said cable;

means for interconnecting said downrigger and said reel of said fishing pole and reel assembly;

a temperature selector switching circuit operable to select a desired temperature, said temperature selector switching circuit being electrically interconnected with said thermal sensing element;

means for electrically interconnecting said means for interconnecting said downrigger and said reel and said temperature selector circuit; and said means for interconnecting said downrigger and said reel comprising driving components that frictionally interconnect said downrigger and said reel.

13. The combination of claim 12 further including means for jigging said cable.

14. The combination of claim 12 wherein said fishing pole and reel assembly includes a length of fishing line stored on said reel, said line having a free end, said free end of said line being fitted to said weight.

15. The combination of claim 14 wherein said free end of said lien is releasably attached to said weight.

16. In combination with a motor-driven downrigger having a cable end region and a weight attached thereto, a water temperature-sensitive system to automatically seek and reach a region of water having a preselected temperature, said combination including:

a fishing pole and reel assembly fitted to said downrigger;

a thermal sensing element disposed on said end region of said cable;

means for interconnecting said downrigger and said reel of said fishing pole and reel assembly;

a temperature selector switching circuit operable to select a desired temperature, said temperature selector switching circuit being electrically interconnected with said thermal sensing element;

means for electrically interconnecting said means for interconnecting said downrigger and said reel and said thermal sensing element; and said means for interconnecting comprises a belt interconnecting said downrigger and said reel of said fishing pole and reel assembly.

17. In a water temperature-sensitive downrigger system to automatically seek and reach a region of water having a desired temperature, the temperature-sensitive downrigger system comprising:

a main support member;

a motor assembly including a drum, said assembly being fitted to said main support member;

a length of cable stored on said drum, said cable having a free end region;

a weight attached to said free end region;

a cable support fixed to said motor assembly, said support including a passage defined therein through which said cable reversibly passes;

a fishing pole assembly including a reel, said assembly being attached to said main support member;

a length of fishing line stored on said reel, said line having a free end, said free end of said line being fitted to said free end region of said cable;

a motor engageable with said reel for reversibly winding said reel;

a thermal sensing element disposed on said end region of said cable;

means for simultaneously operating said drum and said reel selectively in one direction or the other;

a temperature selector switching circuit operable to select a desired temperature, said temperature selector switching circuit being electrically interconnected with said thermal sensing element; and means for electrically interconnecting said means for simultaneously operating said temperature selector circuit.

* * * * *